United States Patent [19]

Harmony

[11] 3,899,136

[45] Aug. 12, 1975

[54] EMITTER FOR IRRIGATION SYSTEMS

[75] Inventor: Richard C. Harmony, Tucson, Ariz.

[73] Assignee: Harmony Emitter Company, Inc., Tucson, Ariz.

[22] Filed: Apr. 1, 1974

[21] Appl. No.: 456,617

[52] U.S. Cl. .............. 239/534; 239/542; 239/590.5
[51] Int. Cl. .............................................. B05b 1/32
[58] Field of Search ........... 239/107, 108, 542, 547, 239/267, 269, 534, 535, 546, 553.5, 590.5

[56] References Cited
UNITED STATES PATENTS

| | | | |
|---|---|---|---|
| 1,366,685 | 1/1921 | Wilson | 239/590.5 X |
| 3,685,735 | 11/1970 | Foster | 239/534 X |
| 3,767,124 | 10/1973 | Spencer | 239/107 |
| 3,777,987 | 12/1973 | Allport | 239/542 |
| 3,779,468 | 12/1973 | Spencer | 239/542 |

*Primary Examiner*—Robert S. Ward, Jr.
*Assistant Examiner*—John J. Love
*Attorney, Agent, or Firm*—Cahill, Sutton & Thomas

[57] ABSTRACT

An emitter formed by a pair of coterminous sheets adjacent one another and forming a discharge passageway extending from a source of pressurized water to a discharge outlet. A pressure sensitive chamber in communication with the pressurized water source is formed adjacent the exterior surface of each sheet by a half round section to bias the coterminous sheets toward one another and regulate the rate of water flow through the discharge passageway and discharge outlet.

10 Claims, 4 Drawing Figures

EMITTER FOR IRRIGATION SYSTEMS

The present invention relates to water dispersing apparatus, and, more particularly, to emitters for irrigating soil.

Irrigation devices of various types have been available for a number of years. These devices may generally be classified into one of two categories: those intended for home use; and, those intended for industrial application.

The devices intended for home use are usually attachable to a water hose and include a multi-port pressure reducing chamber. The water outflow is at a sufficiently low rate so as not to erode the soil from about the plant roots. The rate of water flow is, however, dependent upon the water pressure within the water hose. Therefore, some judgement has to be exercised in regulating the flow of water through the water hose. Where clean water is used, no problems generally develop. However, if the water contains particulate matter of greater than microscopic size, one or more ports within the device generally become clogged and cause a resulting increase in the rate of water flow through the remaining ports. The force of the increased water flow can and often does cause erosion of the surrounding soil.

The devices intended for industrial use are generally connected to a source of irrigation water, that is, water which does contain suspended particulate matter. To overcome the clogging effects of the particulate matter, the outlet ports in these devices are generally of resilient material to permit them to expand as necessary to pass the particulate matter. Where a port expands to pass the particulate matter, the rate of water flow therethrough simultaneously increases. The increased water flow tends to reduce the water pressure within the common envelope feeding the devices and results in a reduction of water flow through the remaining ports. Thereby, uneven irrigation often results. Due to aging, the resilient material may not be able to contract to its initial size and thereby contribute to an uneven rate of water discharge.

Where a plurality of devices or ports are disposed along a length of hose, a substantial pressure gradient exists through the length of the hose. The pressure gradient, in turn, tends to cause a proportional water outflow from the devices or ports. Such variation in water flow produces nonuniform irrigation along the length of the hose.

The following patents are representative of the state of the art in soakers and irrigation devices: U.S. Pat. Nos. 2,851,306, 3,698,195, 3,303,800, 3,116,019, 3,685,735, 3,788,544, 3,667,685, 3,080,124, 3,221,996, 3,555,654, 3,767,124, 3,780,946.

It is therefore a primary object of the present invention to provide an emitter which delivers a constant flow of water despite variations in the water pressure.

Another object of the present invention is to provide a self regulating emitter for irrigation systems.

Yet another object of the present invention is to provide a self flushing emitter for irrigation systems.

Still another object of the present invention is to provide an emitter which is non-clogging.

A further object of the present invention is to provide an irrigation system having a plurality of emitters connected to a water distribution pipe where the rate of water flow through each emitter is constant, regardless of the location of the emitter along the pipe.

A yet further object of the present invention is to provide an emitter for irrigation systems which is useable with irrigation water having particulate matter suspended therein.

A yet further object of the present invention is to provide an inexpensive, easily manufacturable emitter.

A still further object of the present invention is to provide an emitter which requires no adjustments to control the rate of water flow therethrough despite variations in water pressure.

These and other objects of the present invention will become apparent to those skilled in the art as the description thereof proceeds.

The present invention may be described with greater specificity and clarity with reference to the following drawings, in which.

Figure 1:
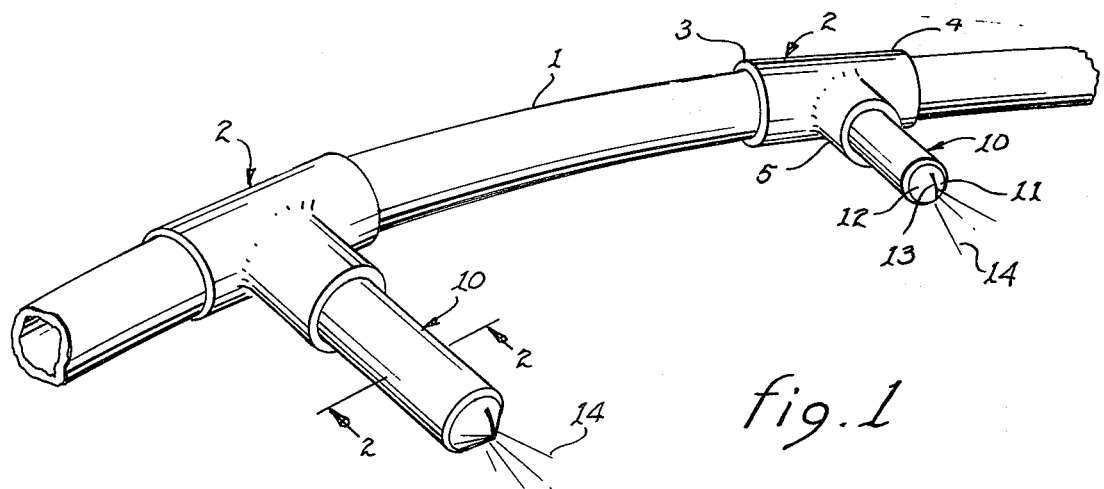
FIG. 1 illustrates the present invention attached to a water distribution pipe of an irrigation system.

An irrigation system incorporating the present invention is shown in FIG. 1. A water distribution pipe 1, representing a source of water under pressure, includes a plurality of T-fittings 2 having arms 3 and 4 engaging sections of the pipe. The third arm 5 of T-fitting 2 may be directly connected to the emitter 10 of the present invention. Alternately, a length of hose may be inserted intermediate arm 5 and emitter 10.

Emitter 10 is formed as a cylindrical device having one end adapted to mate with arm 5. The other end of the emitter 10 includes a pair of lips 11 and 12 defining a mouth 13 therebetween. The water flows through an internal passageway within emitter 10 and emerges from mouth 13, as depicted by numeral 14. The rate of water flow is constant despite variations in water pressure and is controlled by the constructural features of emitter 10.

Figure 2:
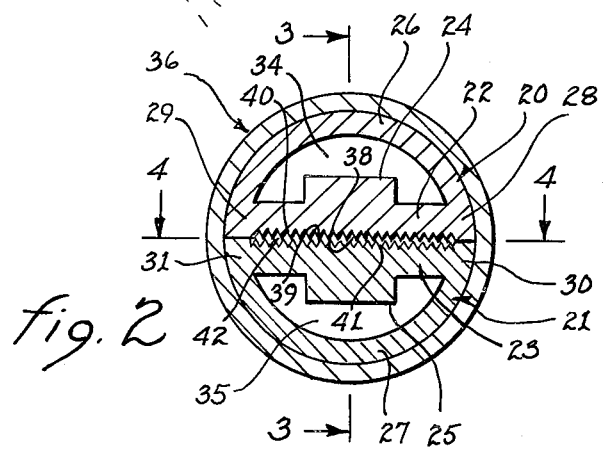
FIG. 2 illustrates a cross-section of the present invention taken along lines 2—2, as shown in FIG. 1.
Figure 3:
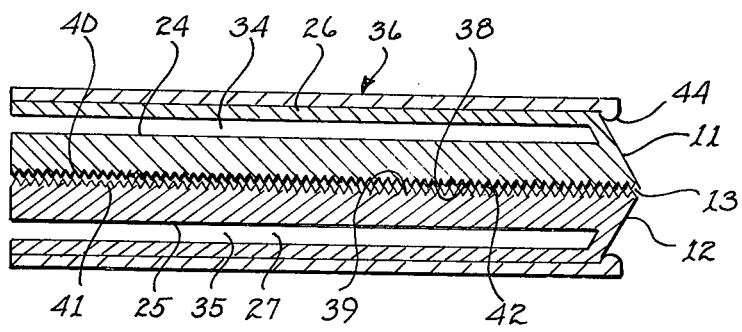
FIG. 3 illustrates a cross-section of the present invention taken along lines 3—3, as shown in FIG. 2.
Figure 4:
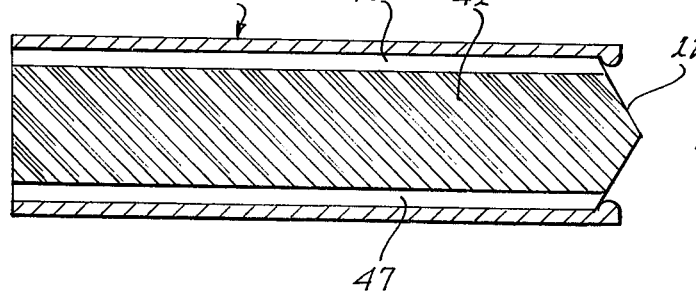
FIG. 4 depicts a cross-section of the present invention taken along lines 4—4, as shown in FIG. 2.

Referring jointly to FIGS. 2, 3 and 4, the component parts of emitter 10 will be described in detail. The emitter 10 includes a pair of half round sections 20 and 21 maintained in juxtaposed relationship by a cylindrical envelope 36. Half round section 20 is formed by an imperforate flexible sheet 22, extending across a half round canopy 26. A longitudinal ridge 24 is attached to or formed as an integral part of flexible sheet 22. The ridge tends to restrain flexing of the flexible sheet along its longitudinal axis. Half round section 21 is similarly formed by an imperforate flexible sheet 23, an attached or integral ridge 25 and a half round canopy 27.

Each half round section 20 and 21 may be formed as an integral unit. Alternatively, each of the half round canopies may be formed separately of the respective flexible sheet. In such case, the half round canopies may be placed upon or joined to lateral edges of the respective flexible sheet, that is, edges 28 and 29 of sheet 22 or edges 30 and 31 of sheet 23.

A plurality of ribs 40, which ribs are angularly oriented on a 45° bias to the longitudinal axis of emitter 10, are disposed within sheet 22 at the central part of surface 38. Similarly oriented ribs 41 are disposed within sheet 23 at the central part of surface 39. When the emitter 10 is assembled as shown in FIG. 2, ribs 40 intersect the opposing ribs 41 at an angle of 90° and form interstices therebetween. The lateral parts of surface 38 in proximity to edges 28 and 29 are flat to sealingly mate with similar flattened lateral parts of surface 39 in proximity to edges 30 and 31. The interstices between surfaces 38 and 39 extending through the length of emitter 10 define a passageway 42 through the emitter.

The half round canopies and the flexible sheet of each of half round section, 20 and 21, define a chamber 34 and 35, respectively. One end of each of these chambers are closed by lip 11 or 12. The other end of each chamber is in communication with arm 5 and the water pressure therein such that the pressure within each chamber is essentially equivalent to the water pressure within pipe 1 (see FIG. 1). Thereby, the water pressure within pipe 1, via the chambers, will provide a bias acting upon the respective flexible sheet.

The two half round sections 20 and 21 are maintained in position with respect to one another by means of cylindrical envelope 36. A bead 44 extends radially inwardly from envelope 36 and contacts the radial surface of lips 11 and 12 to prevent half round sections 20 and 21 from being forced therepast.

In operation, emitter 10 is connected, either directly or by means of a hose, to arm 5, whereby water will flow through arm 5 into passageway 42 defined by surfaces 38 and 39 and discharge through mouth 13. Because of the orthogonally oriented ribs 40 and 41, the water flow through the passageway will be random and turbulent. The randomness and turbulence of the water flow will establish a water pressure gradient from the input end of emitter 10 to mouth 13 within the passageway. Simultaneously, water will also flow into each of chambers 34 and 35. The water pressure extant within chambers 34 and 35 will tend to bias flexible sheets 22 and 23 toward one another to prevent lateral expansion of the passageway 42. Because of the interstices between ribs 40 and 41, passageway 42 will never be completely closed to water flow despite substantial increases in pressure within chambers 34 and 35.

Should the water pressure within pipe 1 (see FIG. 1) vary at different locations of emitters 10, the present invention accommodates such variation while providing an essentially constant rate of water discharge at each emitter. As stated above, the interstices determines the water flow which will always occur regardless of the amount of water pressure within pipe 1. Normally, an increase in water pressure within passageway 42 would tend to laterally displace surfaces 38 and 39 from one another and thereby expand the passageway. Such an expanded passageway would, of course, increase the water flow therethrough. The expansion, however, is inhibited by the simultaneous increase in water pressure within chambers 34 and 35. This increase in water pressure will tend to maintain surfaces 38 and 39 adjacent one another. Due to the pressure gradient extant within passageway 42, the water pressure within the passageway in proximity to mouth 13 is substantially less than the water pressure within chambers 35 and 35. The pressure differential may possibly slightly compress the ribs 40 and 41 to reduce the size of the interstices. Whereby, the cross-section of passageway 42 is reduced in response to the increased means level of the pressure gradient resulting in a constant rate of water flow through mouth 13. Thus, a predetermined regulated water flow will always be present at each emitter 10, regardless of the water pressure within the attached section of pipe 1.

If the water within pipe 1 is contaminated by suspended particulate matter, it may be quite likely that such particulate matter would be forced into passageway 42. Should the particulate matter be too large to freely flow through the interstices, it may become lodged intermediate surfaces 38 and 39. In order for the particulate matter to become lodged, it will have to exert a lateral force upon each of the surfaces 38 and 39. Such a lateral force will tend to displace the surfaces from one another. The increased displacement of the surfaces will increase the flow of water in proximity thereto and tend to force the particulate matter through the passageway.

By experimentation, it has been found that the turbulent water flow within passageway 42 will wash out most particulate matter. Thereby, the present invention is self cleansing. Through further experimentation, it has been found that with an emitter having a half inch wide passageway, particulate matter of up to one eighth of an inch in diameter can be passed by the emitter. Thereby, the present invention is also non-clogging.

It may be noted that the present invention can be assembled from three easily manufactured parts, the half round sections 20, 21 and envelope 36. Thereby, the present invention is substantially more simple than any prior art devices and can be produced at a fraction of the cost of comparable emitters.

While the principles of the invention have been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. An emitter having a water discharge outlet and connected to a source of water under pressure for irrigating soil, said emitter comprising:
    a. a pair of imperforate flexible sheets coterminous with one another and defining both the water discharge passageway for a flow of water through said emitter and the water discharge outlet of said emitter, said passageway extending from the pressurized water source to the discharge outlet of said emitter;
    b. transverse rib means disposed within the central part of adjacent surfaces of each of said pair of flexible sheets for establishing a water pressure gradient through said passageway;
    c. pressure means for biasing said pair of sheets toward one another to regulate the lateral expansion of said passageway, said pressure means being responsive to the water pressure at the source and variable in proportion to the water pressure at the source; whereby, the flow of water through said emitter is regulated at a constant rate by said rib means and said pressure means despite variations in the water pressure at the source.

2. An emitter connected to a source of water under pressure for irrigating soil, said emitter comprising:
    a. a pair of imperforate flexible sheets coterminous with one another, said pair of flexible sheets defining a passageway for a flow of water through said emitter;

b. transverse rib means disposed within the central part of adjacent surfaces of each of said pair of flexible sheets for establishing a water pressure gradient through said passageway;

c. pressure means for biasing said pair of sheets toward one another to regulate the lateral expansion of said passageway, said pressure means being responsive to the water pressure at the source and variable in proportion to the water pressure at the source, said pressure means including a half round section comprising a half round canopy attached to one of said pair of flexible sheets at the sides of said passageway, said canopy, in combination with the attached one of said flexible sheets, defining a pressure chamber in communication with the water pressure at the source; whereby, the flow of water through said emitter is regulated at a constant rate by said rib means and said pressure means despite variations in the water pressure at the source.

3. The emitter as set forth in claim 2 including a further half round section comprising a further half round canopy attached to another of said pair of flexible sheets at the sides of said passageway, said further canopy, in combination with the attached one of said flexible sheets, defining a further pressure chamber in communication with the water pressure at the source.

4. The emitter as set forth in claim 3 including an envelope circumscribing said half round section and said further half round section to maintain said flexible sheets adjacent one another.

5. The emitter as set forth in claim 4 including sealing means disposed within each of said pair of flexible sheets parallel to said passageway for maintaining the flow of water through said passageway.

6. The emitter as set forth in claim 5 wherein said rib means comprises a plurality of transverse ribs disposed within the central part of each of said flexible sheets.

7. The emitter as set forth in claim 6 wherein said plurality of ribs within one of said flexible sheets are orthogonally oriented to said plurality of ribs within the other of said flexible sheets.

8. The emitter as set forth in claim 7 including ridge means connected to each of said flexible sheets for regulating the flexing of said flexible sheets.

9. The emitter as set forth in claim 8 wherein said ridge means extends into respective ones of said pressure chambers.

10. The emitter as set forth in claim 9 wherein said flexible sheet, said half round canopy and said ridge means of each said half round section comprise a unitary structure.

* * * * *